Dec. 13, 1966  R. C. McLAUGHLIN  3,292,071
RECTIFIER PROTECTING CIRCUIT

Filed Nov. 19, 1963  2 Sheets-Sheet 1

*Inventor*
*Robert C. McLaughlin*
By
Mueller & Aichele
Attys.

Dec. 13, 1966   R. C. McLAUGHLIN   3,292,071
RECTIFIER PROTECTING CIRCUIT
Filed Nov. 19, 1963                                                    2 Sheets-Sheet 2
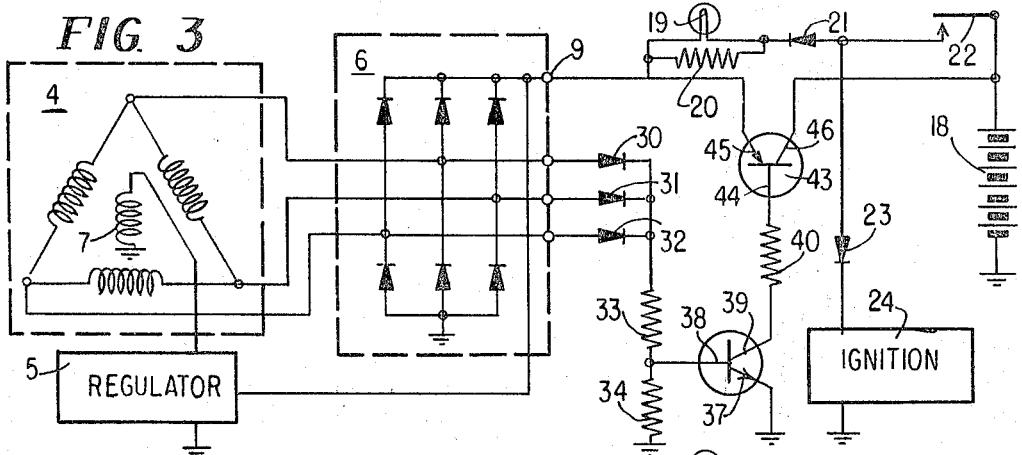
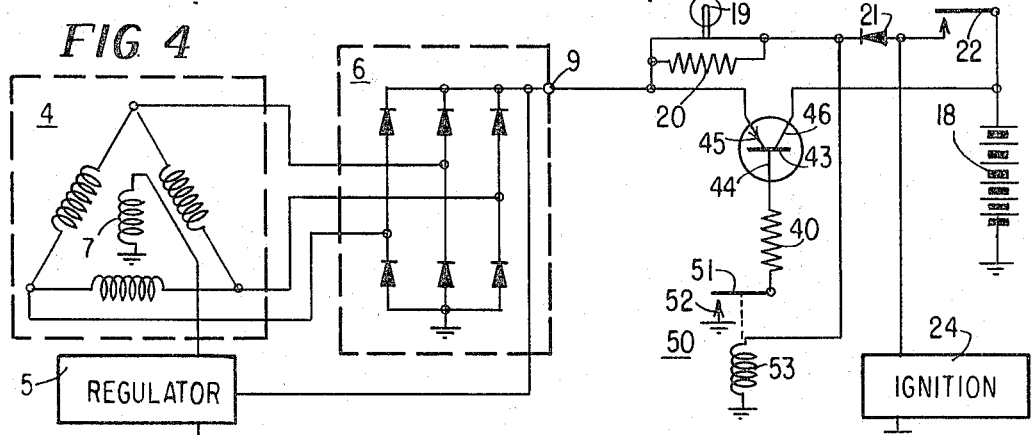
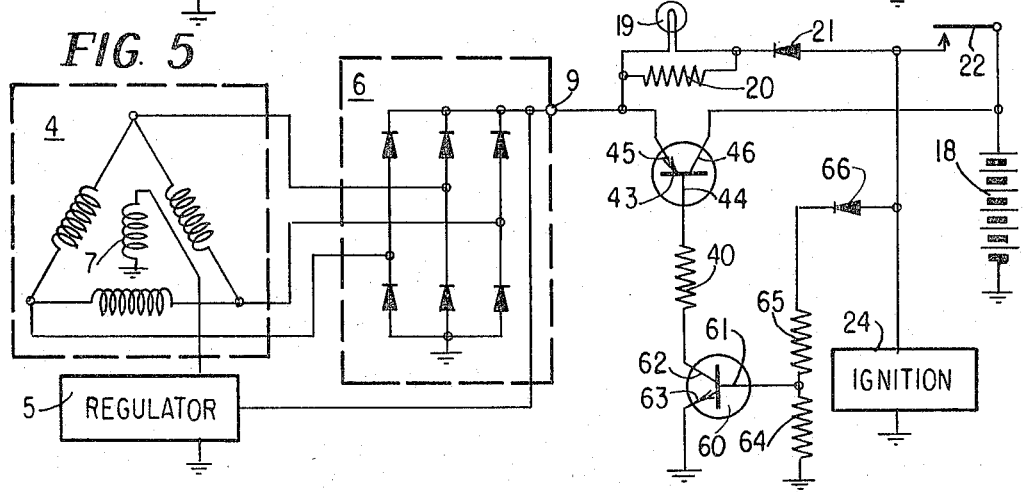
INVENTOR.
Robert C. McLaughlin.
BY
Mueller & Aichele
Attys.

United States Patent Office 3,292,071
Patented Dec. 13, 1966

3,292,071
RECTIFIER PROTECTING CIRCUIT
Robert C. McLaughlin, Bloomingdale, Ill., assignor to Motorola, Inc., Franklin Park, Ill., a corporation of Illinois
Filed Nov. 19, 1963, Ser. No. 324,697
12 Claims. (Cl. 320—25)

This invention relates to diode protection circuits, and in particular to the protection of diodes used to rectify the output of an alternator for charging a battery from the application of an incorrect battery polarity thereto.

In modern automobiles the conventional direct current generator is being replaced with an alternator whose alternating current output is converted to direct current by diode rectifiers. If a new battery is installed, or if the installed battery is reinforced with another battery and the new battery is connected into the circuit with its polarity reversed from that for which the circuit was designed, the rectifying diodes will be connected across the new battery in the forward direction and the current flow through the diodes will be limited only by the resistance of the wiring and the battery. This heavy current will destroy the diodes unless they are protected.

It is therefore an object of this invention to prevent damage to diodes, used to rectify the output of a vehicular alternator system, by the application thereto of a voltage of incorrect polarity.

Another object of this invention is to provide an alternator electrical system for a motor vehicle wherein the alternator is prevented from operating when the battery connected to the alternator system has the incorrect polarity.

A further object of this invention is to provide an alternator system wherein a potential source is connected to the rectifying diodes of a vehicular alternator system only when the alternator is operating and the potential source has the correct polarity.

A feature of this invention is the provision of an alternator system including a semiconductor switch connecting a potential source to an alternator rectifier circuit, and responsive to the polarity of the source to connect the source to the alternator rectifier circuit only when the source polarity is correct. The semiconductor switch may be a silicon controlled rectifier or a transistor.

Another feature of this invention is the provision of a vehicle electrical system including a diode connecting the potential source to the vehicle ignition system and poled to prevent operation of the ignition system if the source polarity is incorrect.

A further feature of this invention is the provision of an alternator system including a diode connecting the potential source to the alternator field and poled to prevent operation of the alternator if the source polarity is incorrect.

Another feature of this invention is the provision of an alternator system including a separate alternator winding to generate a trigger pulse which controls a silicon controlled rectifier which operates to connect a potential source to the alternator.

This invention is illustrated in the drawings wherein:

FIG. 3 is a schematic diagram of an embodiment of this invention incorporating a transistor switch operated when a potential is developed by the alternator;

FIG. 4 is a schematic diagram of an embodiment of this invention incorporating a transistor switch operated by a relay; and FIG. 5 is a schematic diagram of an embodiment of this invention wherein the relay of FIG. 4 is replaced by a second transistor switch.

In practicing this invention the output of an alternator, used in a motor vehicle, is coupled to a battery through a semiconductor switch. This switch is controlled by a bias circuit, responsive to the polarity of the battery, to close the semiconductor switch only if the battery polarity is correct. Either a transistor or silicon controlled rectifier (SCR) may be used as the semiconductor switch.

In one embodiment the bias circuit is coupled to the battery and responds to the battery polarity directly to bias the semiconductor switch so that it conducts if the battery polarity is correct. In another embodiment the bias circuit is coupled to the alternator and responds to the alternator output to turn on the semiconductor switch. In this second embodiment, the alternator field circuit and the vehicle ignition systems are responsive to the battery polarity to prevent the alternator from developing an output if the battery polarity is incorrect.

Figure 1:
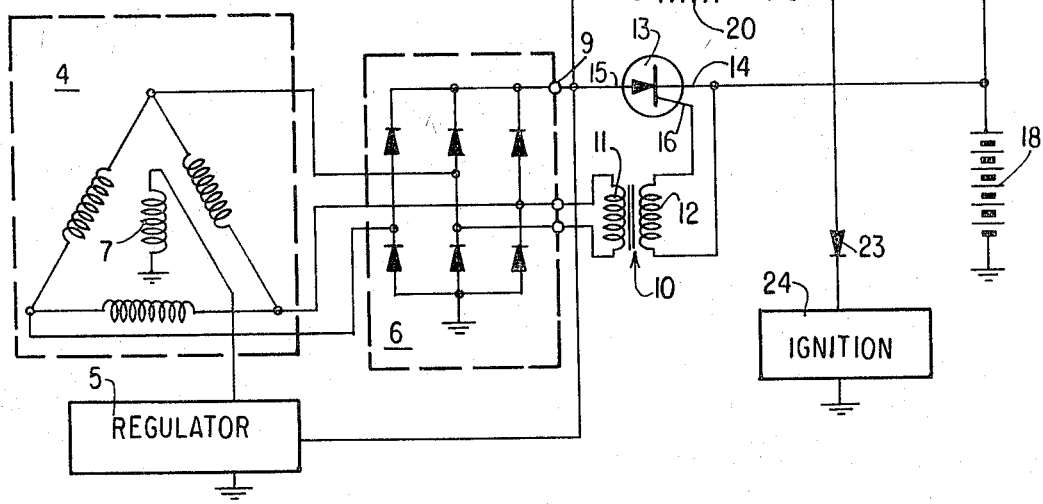
FIG. 1 is a schematic diagram of an embodiment of this invention incorporating a silicon controlled rectifier for connecting the battery to the alternator.

FIG. 1 illustrates a circuit embodying the invention incorporating an SCR as the semiconductor switch. The power generation system of a motor vehicle consists of a three phase alternator 4, a regulator 5 and rectifying diodes 6. The output of the alternator 4 is a three phase alternating current which is coupled to diodes 6 and rectified thereby to produce a direct current output at terminal 9. The direct current output from terminal 9 is coupled to the battery 18 by SCR 13. If the output from terminal 9 were coupled directly to the battery 18 and the battery were connected into the circuit with its polarity reversed diodes 6 would be biased in the forward direction and would be destroyed or damaged by the resulting heavy current flow through them.

The anode 15 of SCR 13 is coupled to terminal 9 and the cathode 14 is coupled to the battery 18. SCR 13 is poled to conduct the positive potential developed by the alternator to the battery 18 when gated on. The secondary 12 of transformer 10 is connected to the cathode 14 and control gate 16 of SCR 13. The primary winding 11 of transformer 10 is coupled to one phase of the alternator 4.

In operation the SCR blocks current in both the forward and reverse directions until a trigger pulse is applied to the control terminal 16. Thereafter the applied voltage produces a forward current which is limited essentially only by the load impedance. Although a trigger pulse to the control terminal 16 can turn the device on it is necessary to remove the anode voltage to turn the SCR off.

Secondary winding 12 of transformer 10 applies a trigger pulse of the proper polarity to control winding 16 in response to a voltage developed by alternator 4 to cause SCR 13 to conduct when the anode to cathode voltage applied thereto is the proper polarity. Thus the SCR 13 isolates the diodes 6 from the battery 18 until alternator 4 produces an output voltage sufficient to develop a trigger pulse in secondary winding 12 of transformer 10.

In order for alternator 4 to develop an output voltage field winding 7 must be energized through regulator 5. Energy for the field winding 7 is supplied initially from battery 18 through switch 22, diode 21, lamp 19 and resistor 20 connected in parallel, regulator 5 to the field winding 7. Lamp 19 is an indicator lamp to show proper operation of the charging circuit, and resistor 20 operates to furnish field current in the event of failure of lamp 19. Diode 21 is poled to prevent energy from reaching field 7 of alternator 4 if battery 18 is connected with its polarity reversed. In FIG. 1 the system shown has a negative ground and thus the positive terminal of battery 18 should be connected to switch 22. If this connection is reversed so that the positive terminal of battery 18 is connected to ground and the negative terminal of battery 18 is connected to switch 22, diode 21 will prevent energy from reaching the field winding 7 of alternator 4 and the alternator will not generate an output sufficient to develop a trigger pulse for SCR 13.

Energy for the ignition system 24 of the vehicle is supplied from battery 18 through switch 22 and diode 23. Diode 23 is also poled to prevent energy from battery 18 from reaching the ignition system 24 in the event that the battery is incorrectly connected. Thus if battery 18 is incorrectly connected to the circuit the engine of the vehicle will not start and the alternator 4 mechanically connected to the engine, will not develop an output sufficient to supply a trigger pulse to the SCR. The battery will not be connected to the alternator diodes 6 and they will not be subjected to an excessive current.

Figure 2:
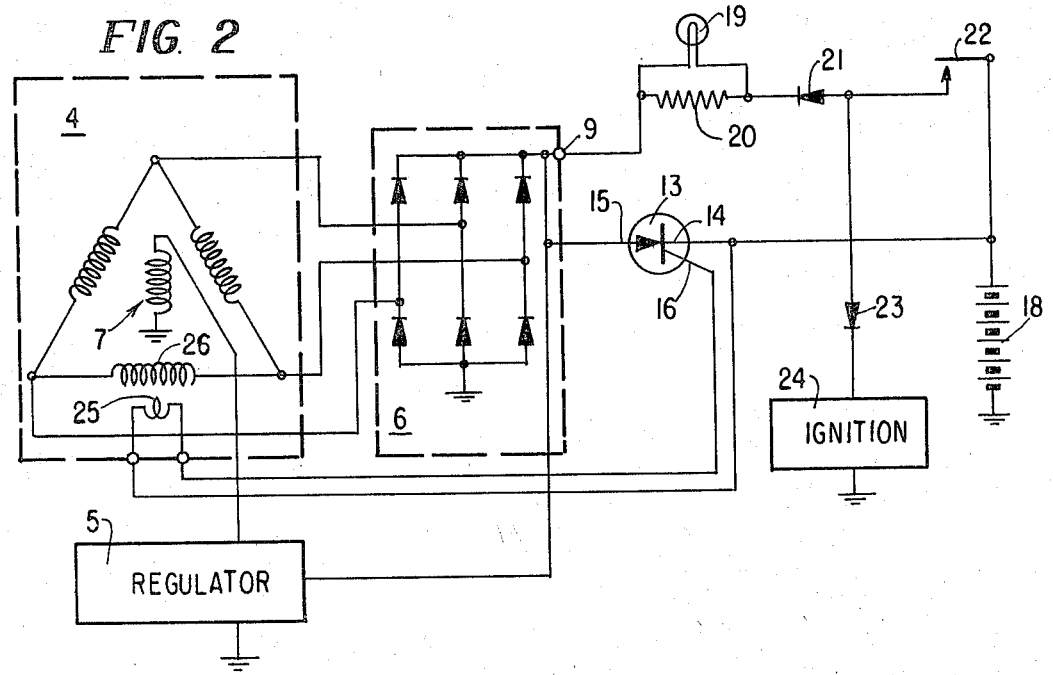
FIG. 2 is a schematic diagram of an embodiment of this invention incorporating a silicon controlled rectifier operated by an alternating current derived from a separate winding of the alternator.

FIG. 2 illustrates a variation of the circuit shown in FIG. 1 in which the transformer 10 of FIG. 1 is replaced by a separate winding 25 on alternator 4. Identical components of FIG. 2 have the same numbers as FIG. 1. In the system shown in FIG. 2 the output of the alternator 4 is coupled to the control input 16 of SCR 13. Winding 25 is an integral part of alternator 4 and is magnetically coupled to one phase winding 26 thereof. Winding 25 will develop a control potential when alternator 4 develops an output voltage and this control potential is applied to SCR 13 to cause it to connect the alternator 4 to the potential source 18. Diodes 21 and 23 operate in the manner previously described to prevent alternator 4 from developing an output voltage if battery 18 is connected into the circuit with its polarity reversed.

Another embodiment of this invention is shown in FIG. 3 in which a transistor is used in place of the SCR to connect the alternator output to the battery. Similar components of FIG. 3 have the same numbers as those in FIGS. 1 and 2.

The output of each phase of alternator 4 is coupled to the base 38 of transistor 37 through diodes 30, 31 and 32 and resistors 33 and 34. Diodes 30, 31 and 32 produce a direct current potential from the alternating current potential applied thereto and resistors 33 and 34 develop a bias potential for the base 38 of transistor 37. When there is no output from the alternator the base 38 of transistor 37 is at ground potential and transistor 37 is biased off. When alternator 4 develops a voltage of sufficient magnitude the base 38 is biased so that transistor 37 conducts and the collector 39 falls to near ground potential. This potential is applied through resistor 40 to the base 44 of transistor 43, to bias transistor 43 to conduction. The emitter 45 of transistor 43 is connected to the alternator rectifier output terminal 9 and the collector 46 is connected to the battery. When transistor 43 is biased to conduction the battery 18 is connected to the alternator output terminal 9. Diodes 21 and 23 act in a manner previously described to prevent alternator 4 from developing an output potential if battery 18 is connected into the circuit with its polarity reversed. Thus transistor 43 acts as a switch to prevent the flow of current through the rectifier diodes 6 if battery 18 is connected to the circuit incorrectly and thereby prevent the burnout of diodes 6.

FIGS. 4 and 5 illustrate embodiments of the invention in which the transistor switch 43 is controlled directly from the battery potential. In FIGS. 4 and 5 similar components have the same numbers as components in FIGS. 1, 2 and 3. Transistor switch 43 couples the output terminal of the alternator 9 to the battery 18. Bias voltage is supplied through resistor 40 to the base 44 of transistor 43. When relay 50 is actuated the relay arm 51 is connected to contact 52 thus providing the proper bias to the base 44 to turn on transistor 43. Power then flows from terminal 9 through the emitter 45, collector 46 of transistor 43 to the battery 18. Power to close relay 50 is furnished from battery 18 through switch 22, diode 21 to coil 53 of relay 50. Diode 21 is poled to prevent operation of relay 50 if battery 18 is connected with its polarity reversed.

In FIG. 5 switch 50 has been replaced by transistor 60. The base 44 of transistor 43 is coupled to ground potential through resistor 40, collector 62 and emitter 63 of transistor 60. A bias voltage for the base 61 of transistor 60 is furnished from battery 18 through switch 22, diode 66 and resistors 64 and 65. The bias voltage acts to turn on transistor 60 thus connecting the base 44 of transistor 43 to near ground potential. This potential turns on transistor 43 and connects the output of alternator 4 to the battery 18 through transistor 43. Diode 66 is poled to prevent current from reaching the base 61 of transistor 60 in the event battery 18 is connected into the circuit with its polarity reversed. In this event transisor 60 is not biased to conduction and transistor 43 remains cut off thus isolating the diodes of the alternator rectifier from an incorrectly connected battery.

An electrical system for a motor vehicle, has been provided in which the diodes used to rectify the output of an alternator are protected against the application of an incorrect polarity potential. A semiconductor switch connects the vehicle battery to the alternator diodes only when the battery polarity is correct, thus preventing damage to the diodes. The semiconductor switch can be a transistor or a silicon controlled rectifier and can be responsive to the battery polarity directly or to the alternator output which is responsive to the battery polarity.

I claim:

1. In an electrical system for a motor vehicle and which includes a battery, alternating current generation means, a plurality of diodes connected to the alternating current generation means for providing a direct current potential to charge the battery, and an ignition system, a diode protection circuit including in combination, semiconductor switch means coupled between the plurality of diodes and the battery, first circuit means coupling said semiconductor switch means to the generation means and responsive thereto to cause said switch means to connect the battery to the plurality of diodes when the generation means produces an output potential, and second circuit means coupling the battery to the ignition system, said second circuit means being responsive to the polarity of the battery and applying a potential from the battery to the ignition system when the polarity of the battery is correct, said second circuit means decoupling the battery from the ignition system when the polarity of the battery is not correct.

2. In an electrical system for a motor vehicle and which includes a battery, alternating current generation means, a plurality of diodes connected to the alternating current generation means for providing a direct current potential to charge the battery, and an ignition system, a diode protection circuit including in combination, semiconductor switch means coupled between the plurality of diodes and the battery, first circuit means coupling said semiconductor switch means to the generation means and responsive thereto to cause said switch means to connect the battery to the plurality of diodes when the generation means produces an output potential, and second circuit means including diode means coupling the battery to the ignition system, said diode means being poled to conduct current when the polarity of the battery is correct.

3. In an electrical system for a motor vehicle and which includes a battery, alternating current generation means, a plurality of diodes connected to the alternating current generation means for providing a direct current potential to charge the battery, and an ignition system, a diode protection circuit including in combinaton, transistor switch means coupled between the plurality of diodes and the battery, first circuit means coupling said switch means to the generation means and responsive thereto to cause said switch means to connect the battery to the plurality of diodes when the generation means produces an output potential, and second circuit means including diode means coupling the battery to the ignition system, said diode means being poled to conduct current when the polarity of the battery is correct.

4. In an electrical system for a motor vehicle and which includes a battery, alternating current generation means, a plurality of diodes connected to the alternating current generation means for providing a direct current potential to charge the battery, and an ignition system, a diode protection circuit including in combination, silicon controlled rectifier switch means coupled between the plurality of diodes and the battery and including a control electrode, first circuit means coupling said control electrode to the generation means, said switch means being responsive to the output potential of the generation means to cause said switch means to connect the battery to the plurality of diodes when the generation means produces said output potential, and second circuit means including diode means coupling the battery to the ignition system, said diode means being poled to conduct current when the polarity of the battery is correct.

5. In an electrical system for a motor vehicle, and which includes a battery, alternating current generation means including a field winding, a plurality of diodes connected to the alternating current generation means for providing a direct current potential to charge the battery, and an ignition system, a diode protection circuit including in combination, transistor switch means coupled between the plurality of diodes and the battery and including a control electrode, first circuit means coupling said control electrode to the generation means, said switch means being responsive to the output potential of the generation means to cause said switch means to cause said switch means to connect the battery to the plurality of diodes when the generation means produces said output potential, second circuit means including first diode means coupling the battery to the ignition system, third circuit means including second diode means coupling the battery to the field winding, said first and second diode means being poled to conduct current when the polarity of the battery is correct.

6. In an electrical system for a motor vehicle, and which includes a battery, alternating current generation means including a field winding, a plurality of diodes connected to the alternating current generation means for providing a direct current potential to charge the battery, and an ignition system, a diode protection circuit including in combination, silicon controlled rectifier switch means coupled between the plurality of diodes and the battery and including a control electrode, first circuit means coupling said control electrode to the generation means, said switch means being responsive to the output potential of the generation means to cause said switch means to connect the battery to the plurality of diodes when the generation means produces said output potential, second circuit means including first diode means coupling the battery to the ignition system, third circuit means including second diode means coupling the battery to the field winding, said first and second diode means being poled to conduct current when the polarity of the battery is correct.

7. In an electrical system for a motor vehicle and which includes a battery, alternating current generation means having a field winding, power output windings and a control winding, a plurality of diodes connected to the power output windings for providing a direct current potential to charge the battery, and an ignition system, a diode protection circuit including in combination, silicon controlled rectifier switch means coupled between the plurality of diodes and the battery, first circuit means coupling said switch means to the control winding and responsive thereto to cause said switch means to connect the battery to the plurality of diodes when the generation means produces an output potential second circuit means including diode means coupling the battery to the ignition system, said diode means being poled to conduct current with the battery connected with the correct polarity.

8. In an electrical system for a motor vehicle and which includes a battery, alternating current generation means having a field winding, power output windings and a control winding, a plurality of diodes connected to the power output windings for providing a direct current potential to charge the battery, and an ignition system, a diode protection circuit including in combination, silicon controlled rectifier switch means coupled between the plurality of diodes and the battery and including a control electrode, first circuit means coupling said control electrode to the control winding, said switch means being responsive to the output potential of the generation means to cause said switch means to connect the battery to the plurality of diodes when the generation means produces said output potential, second circuit means including first diode means coupling the battery to the ignition system, third circuit means including second diode means coupling the battery to the field winding, said first and second diode means being poled to conduct current when the polarity of the battery is correct.

9. In an electrical system for a motor vehicle and which includes a battery, alternating current generation means, a plurality of diodes connected to the alternating current generation means for providing a direct current potential to charge the battery, a diode protection circuit including in combination, transistor switch means coupling the plurality of diodes to the battery and having a control electrode, first circuit means including relay means coupled to said control electrode, second circuit means including diode means coupling said relay means to the battery, said diode means being poled to conduct currents when the polarity of the battery is correct to thereby actuate said relay means, said switch means being responsive to said relay means to cause said switch means to connect the battery to the plurality of diodes when said relay means is actuated.

10. In an electrical system for a motor vehicle and which includes a battery, alternating current generation means, and a plurality of diodes connected to the alternating current generation means and poled to develop a potential of the proper polarity to charge the battery, a diode protection circuit including in combination, first transistor switch means coupling the plurality of diodes to the battery and having a control electrode, first circuit means including second transistor switch means coupled to said control electrode, second circuit means including diode means coupling said second transistor switch means to the battery, said diode means being poled to conduct current when the polarity of the battery is correct to thereby bias said second transistor switch means to conduction, said first transistor switch means being responsive to said second transistor switch means to cause said first transistor switch means to connect the battery to the plurality of diode when said second transistor switch means is biased to conduction.

11. In an electrical system for a motor vehicle, and which includes a battery, alternating current generation means, a plurality of diodes connected to the alternating current generation means for providing a direct current potential to charge the battery, and an ignition system, a diode protection circuit including in combination, silicon controlled rectifier switch means having an input electrode coupled to the plurality of diodes, an output electrode coupled to the battery and a control electrode, transformer means having a primary winding coupled to the generation means and a secondary winding including a pair of output terminals, first circuit means coupling one of said output terminals to said control electrode and the other of said output terminals to one of said input and output electrodes, second circuit means including diode means coupling the battery to the ignition system, said diode means being poled to conduct current with the battery connected with the correct polarity, said silicon controlled rectifier switch means being responsive to the output potential of the alternating current generating means applied thereto through said transformer means to connect the battery to the plurality of diodes.

12. In an electrical system for a motor vehicle and which includes a battery, alternating current generating means having power output windings and a control winding, a plurality of diodes connected to the power output winding for providing a direct current potential to charge the battery, and an ignition system, a diode protection circuit including in combination, silicon controlled rectifier switch means having an input electrode coupled to the plurality of diodes, an output electrode coupled to the battery and a control electrode, first circuit means coupling the control winding to said control electrode and to one of said input and output electrodes, second circuit means including diode means coupling the battery to the ignition system, said diode means being poled to conduct current with the battery connected with the correct polarity, said silicon controlled rectifier switch means being responsive to the output potential of the alternating current generating means applied thereto through the control winding to connect the battery to the plurality of diodes.

References Cited by the Examiner
UNITED STATES PATENTS

| | | | |
|---|---|---|---|
| 3,085,187 | 4/1963 | Godshalk | 320—25 |
| 3,152,298 | 10/1964 | Byles | 320—35 X |
| 3,193,750 | 7/1965 | Chait | 322—73 X |

JOHN F. COUCH, *Primary Examiner.*

S. WEINBERG, *Assistant Examiner.*